(12) United States Patent
Mikolajek

(10) Patent No.: US 9,803,591 B2
(45) Date of Patent: Oct. 31, 2017

(54) VALVE

(71) Applicant: CONTINENTAL AUTOMOTIVE GMBH, Hannover (DE)

(72) Inventor: Carsten Mikolajek, Griesheim (DE)

(73) Assignee: Continental Automotive GmbH, Hannover (DE)

( * ) Notice: Subject to any disclaimer, the term of this patent is extended or adjusted under 35 U.S.C. 154(b) by 71 days.

(21) Appl. No.: 14/647,015

(22) PCT Filed: Nov. 26, 2013

(86) PCT No.: PCT/EP2013/074686
§ 371 (c)(1),
(2) Date: May 22, 2015

(87) PCT Pub. No.: WO2014/082983
PCT Pub. Date: Jun. 5, 2014

(65) Prior Publication Data
US 2015/0292446 A1    Oct. 15, 2015

(30) Foreign Application Priority Data

Nov. 27, 2012 (DE) .................. 10 2012 221 621

(51) Int. Cl.
| | |
|---|---|
| *F16K 11/052* | (2006.01) |
| *F16K 31/04* | (2006.01) |
| *F02M 25/07* | (2006.01) |
| *F02M 35/10* | (2006.01) |
| *F02M 26/16* | (2016.01) |
| *F02M 26/19* | (2016.01) |
| *F02M 26/70* | (2016.01) |

(52) U.S. Cl.
CPC ........ *F02M 25/0793* (2013.01); *F02M 26/16* (2016.02); *F02M 26/19* (2016.02); *F02M 26/70* (2016.02); *F02M 35/10222* (2013.01); *F16K 11/052* (2013.01)

(58) Field of Classification Search
CPC ..... Y10T 137/86815; Y10T 137/86823; Y10T 137/86847; F02M 26/70; F16K 11/052
See application file for complete search history.

(56) References Cited

U.S. PATENT DOCUMENTS 4,267,880 A * 5/1981 Jacquet .............. B60H 1/00678
137/862
4,585,032 A 4/1986 Van Lingen
(Continued)

FOREIGN PATENT DOCUMENTS

| CN | 201133287 | 10/2008 |
|---|---|---|
| DE | 499 691 | 6/1930 |

(Continued)

*Primary Examiner* — Seth W Mackay-Smith
(74) *Attorney, Agent, or Firm* — Cozen O'Connor

(57) ABSTRACT

A valve for regulating two gas flows, includes a housing, two channels arranged in the housing for conducting a respective gas, a first flap arranged in the first channel for opening and closing the first channel, said first flap being rotatably arranged on a shaft, an electric motor for actuating the shaft, a second flap for opening and closing the second channel, and a third channel into which the first and the second channel lead. A connecting element is arranged on the first flap, and the first flap is connected to the second flap.

16 Claims, 2 Drawing Sheets

(56) References Cited

U.S. PATENT DOCUMENTS

| | | | | |
|---|---|---|---|---|
| 6,056,001 | A * | 5/2000 | Boyles | F16K 11/052 137/4 |
| 6,141,961 | A | 11/2000 | Rinckel | |
| 6,925,992 | B1 * | 8/2005 | Eriksson | F16K 11/165 123/568.12 |
| 7,140,392 | B2 * | 11/2006 | Blomquist | F16K 11/163 123/568.24 |
| 2008/0159818 | A1 | 7/2008 | Kato | |
| 2009/0014674 | A1 | 1/2009 | Grissom | |
| 2009/0050830 | A1 | 2/2009 | Albert et al. | |
| 2010/0206274 | A1 | 8/2010 | Furukawa et al. | |
| 2013/0025576 | A1 * | 1/2013 | Busato | F02M 26/16 123/568.11 |

FOREIGN PATENT DOCUMENTS

| | | | |
|---|---|---|---|
| DE | 11 2004 000677 | 9/2013 | |
| EP | 0 987 427 | 3/2000 | |
| EP | 1 564 045 | 8/2005 | |
| EP | 1 748 179 | 1/2007 | |
| EP | 2 042 723 | 4/2009 | |
| EP | 2 085 601 | 8/2009 | |
| FR | 2854200 A1 * | 10/2004 | F01N 3/02 |

* cited by examiner

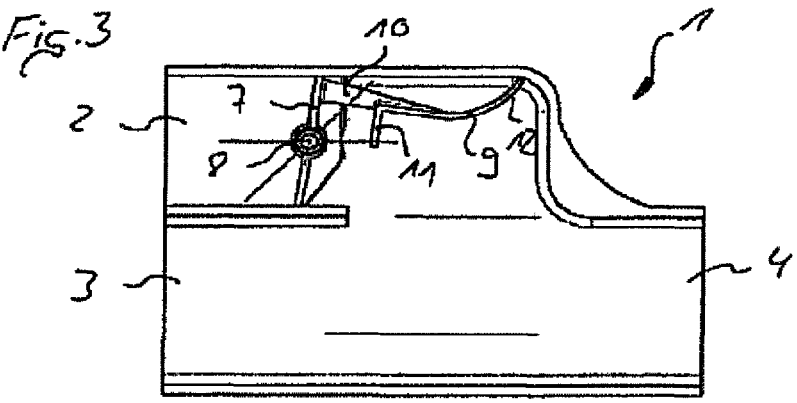
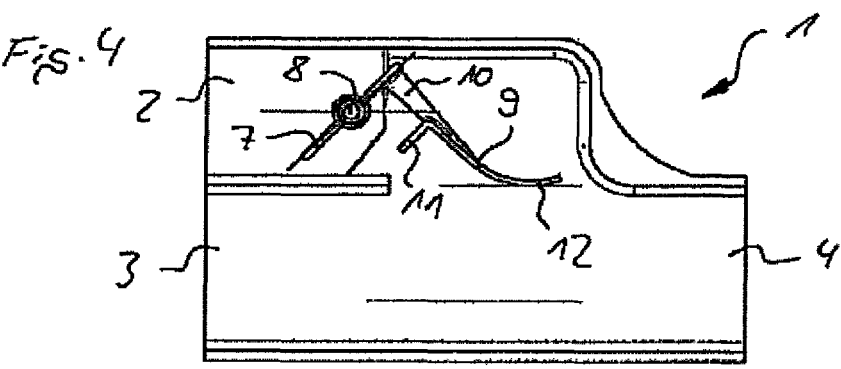
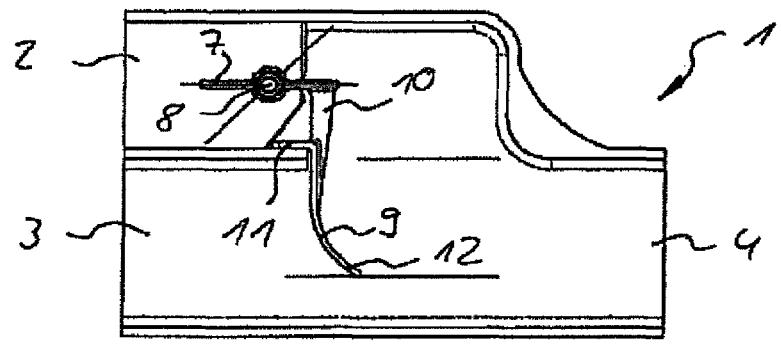

VALVE

CROSS REFERENCE TO RELATED APPLICATIONS

This is a U.S. national stage of application No. PCT/EP2013/074686, filed on Nov. 26, 2013. Priority is claimed on German Application No.: DE102012221621.9 filed Nov. 27, 2012, the content of which is incorporated herein by reference.

BACKGROUND OF THE INVENTION

1. Field of the Invention

An object of the invention is a valve for regulating two gas flows, with a housing, two channels arranged in the housing, each for conducting a respective gas, a first flap arranged in the first channel for opening and closing the first channel. The first flap is arranged rotatably on a shaft, an electric motor for actuating the shaft, a second flap for opening and closing the second channel, and a third channel into which the first and second channels open.

2. Detailed Description of the Prior Art

Such housings are used as mixer valves in motor vehicles, in particular as exhaust gas recirculation valves, and are generally known. Such valves have a channel for the fresh air intake and a second channel for the exhaust gas. A flap is arranged in each channel that opens or closes the respective channel cross section by pivoting. Downstream of the two flaps, the two channels open into a third channel in which the gas flows of the two channels are combined. For mixing the exhaust gas with the intake air, for each pivot angle of the first flap, a specific pivot angle is assigned to the second flap in a specific regime. For this, the second flap must always be controlled as a function of the first flap. For this reason it is known to control one flap with an electric motor drive and the second flap via a gear mechanism. The gear mechanism is also connected to the electric motor drive so that the electric motor drive controls both flaps. The gear mechanism is configured such that the second flap pivots as a function of the first flap following a specific regime. The disadvantage is that the cost of the gear mechanism is very high. As well as the many additional drive components, the housing-side complexity with the many bearing points is not insignificant. Also such a gear mechanism takes up additional construction space.

SUMMARY OF THE INVENTION

One embodiment of the invention is a valve that is simply constructed. In particular, the number of components required is reduced.

The valve has a connecting element arranged on the first flap, and the connecting element is connected to the second flap.

The second flap is positioned relative to the first flap and to the housing by the connecting element. Furthermore, with the connecting element, the pivot angle of the second flap is determined depending on the pivot angle of the first flap following a predefined movement regime. Whereas former coupling mechanisms, starting from the shaft of one flap, transfer the movement to the second flap shaft according to the predefined movement regime, with this valve the movement of one flap is transmitted directly to the second flap. Thus not only is the coupling mechanism between the two shafts no longer required, neither is the shaft for the second flap. The valve according to one embodiment of the invention is distinguished by the omission of a coupling mechanism and the second shaft, and its mounting with particularly few components. As result, this valve is extremely compact and takes up little space. Because of the few components, installation is very simple and the valve has a low weight.

Particularly simply installation results if the connecting element is releasably connected with both flaps. In the simplest case, the components are screwed together or connected together via catches and push-fit connections. In one embodiment, both the flaps and the connecting element have a relatively simple construction.

In one embodiment, the connecting element is formed integrally with at least one flap. The connecting element is produced together with the at least one flap, so that no additional mounting of the flap and connecting element is required. In a valve with two flaps, it is particularly advantageous if both flaps and the connecting element are one component. Also with different flap configurations, such a component can be constructed relatively simply, for example as a casting or by injection molding. Thus no mounting is required between the flaps and the connecting part.

In one embodiment, both flaps are the same material. This has the advantage that, where applicable, one mold can be used for both flaps.

In one embodiment, the two flaps consist of different materials. These may be different metals, metal alloys, and plastics. It is however also possible to produce one flap of metal or a metal alloy and the other flap of a plastic. Because of the thermal load, it is advantageous to produce the flap in the exhaust channel of metal, while the flap in the intake channel may be plastic.

In one embodiment, the connecting element is made of the same material as at least one of the two flaps. This allows the connecting element to be produced together with a flap as one component. In particular if the connecting element and flap are plastic, they can be produced particularly easily and with many design variants by injection molding.

Depending on the movement sequence of the pivoting of the second flap, larger sealing areas are produced than when the flap is arranged rotatably on a shaft. To guarantee a reliable seal of the channel in these cases too, the second flap has a rectangular form while the second channel, at least in the pivot region of the second flap, has a correspondingly rectangular channel cross section.

BRIEF DESCRIPTION OF THE DRAWINGS

The invention is described in more detail with reference to an exemplary embodiment. The drawing shows:

FIGS. 3 to 5 are various positions of the flaps of the valve in FIG. 1.

DETAILED DESCRIPTION OF THE PRESENTLY PREFERRED EMBODIMENTS

Figure 1:
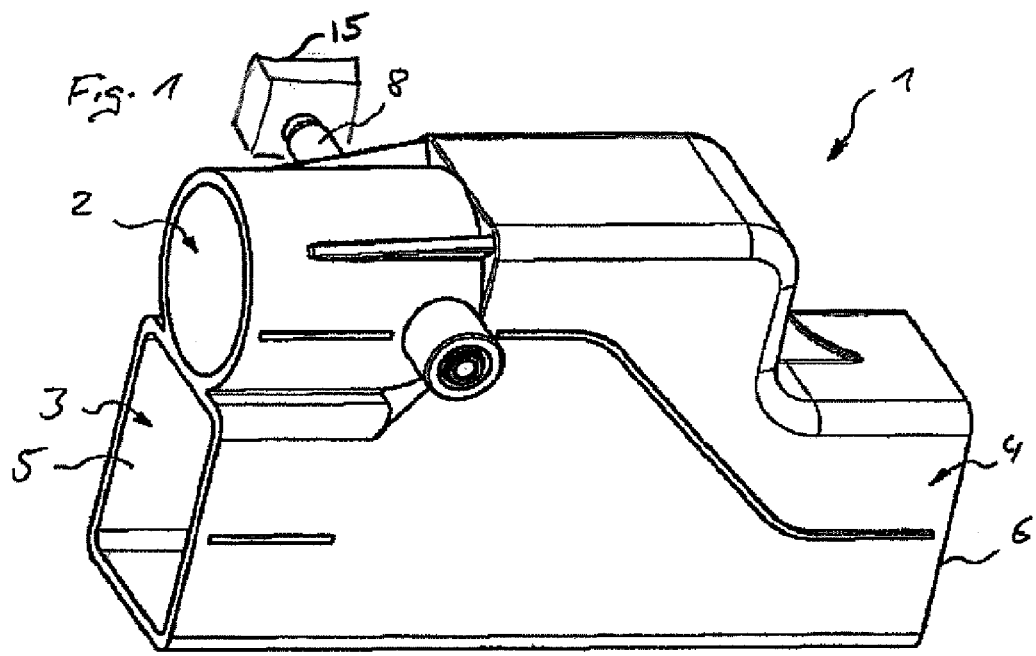
FIG. 1 is a housing of an exhaust gas return valve.

The exhaust gas recirculation valve in FIG. 1 consists of a housing 1 that has a first channel 2 and a second channel 3 and a third channel 4. The first channel 2 is the exhaust channel via which the exhaust gas can be supplied to the intake air. The second channel 3 is the intake channel via which the intake air is conducted. The third channel 4 is the mixing channel via which the two gas flows are conducted further. The exhaust channel 2 has a round cross section, while the intake channel 3 and the mixer channel 4 each have a rectangular cross section. It is also possible that, depending on the geometry of the connecting lines, the inlet 5 of the intake channel 3 and the outlet 6 of the mixer channel 4 have a round cross section. In this case, the rectangular channel cross section of the two channels 3, 4 would be restricted to the center part of the housing 1. In addition, other channel cross sections are conceivable e.g. semi-circular or triangular. Also, instead of a one-piece housing, a multipiece housing could be used in particular for the exhaust and the intake channels.

As shown in FIGS. 3-5, a first flap 7 is arranged rotatably on a shaft 8 in the exhaust channel 2. The shaft 7 is mounted in the housing 1 and connected to an electric drive 15 arranged in the housing 1.

Figure 2:
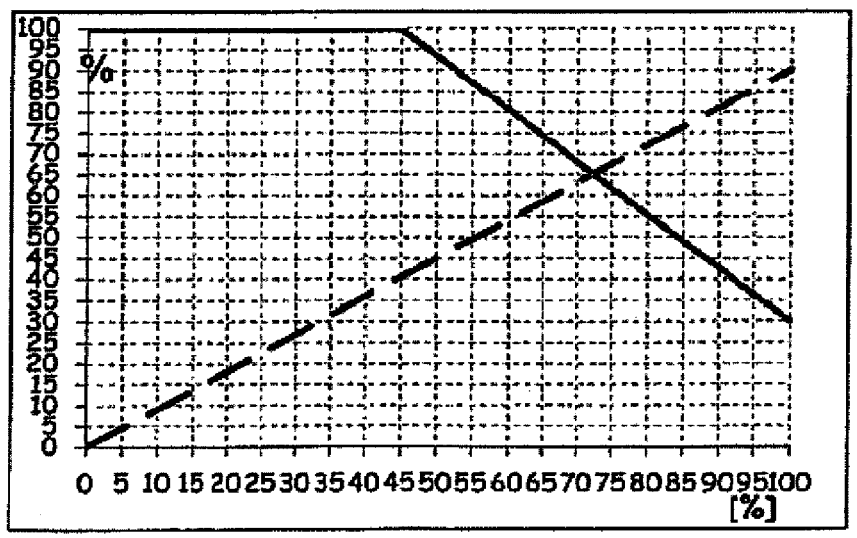
FIG. 2 is a graph of the opening characteristics of the two flaps.

FIG. 2 shows the control regime of the exhaust gas and intake air which is to be produced with the exhaust gas recirculation valve. Starting from an opening cross section (perpendicular axis) of 100% of the intake air (solid line) and 0% of exhaust gas (dotted line). The opening cross section of the intake air may remain unchanged up to an opening cross section of 40% for the exhaust gas. Up to this point, the flaps would be pivoted through 45° (horizontal axis). Only on a further increase in the opening cross section of the exhaust gas will the opening cross section of the intake air be reduced, wherein the opening cross section of the intake air should be no less than 30% when the first flap 7 in the exhaust channel 2 is fully open.

FIGS. 3-5 show the cut-away housing 1 with channels 2-4 and flaps 7, 9. The first flap 7 is arranged rotatably on the shaft 8. On the side of the flap 7 directed downstream, a connecting element 10 is molded integrally in the form of a web. On the other side of the connecting element 10, the second flap 9 is integrally molded. The flaps 7, 9 and the web 10 form an integral component made of plastic by injection molding. The second flap 9, on the side facing the web 10, has an edge 11 angled at right angles. The edge 11 is intended to prevent the intake air from flowing over the edge facing the exhaust channel 2 to the mixer channel 4 in the flap position shown in FIG. 4. Furthermore, the edge 11 may serve as a stop to limit the pivot movement of the flaps. In the present case, the edge 11 lies adjacent to the channel. This serves as a rest point for the edge 11.

In the embodiment shown in FIG. 3, the first flap 7 closes the exhaust channel 2 while the second flap 9 fully opens the intake channel 3. In this position, the second flap 9 is completely positioned in the transition from the exhaust channel 2 to the mixer channel 4 so that the intake air flows to the mixer channel 4 without obstruction.

In FIG. 4, the first flap 7 opens the opening cross section of the exhaust channel 2 up to 40%. At this pivot angle of the first flap, the second flap 9 has been pivoted in the direction of the intake channel 3 so far that it leaves exhaust channel 2 completely open. If the flaps 7, 9 are pivoted further, the edge 11 meets the channel wall as a stop. In this position, the first flap 7 is fully opened and the second flap 9 is at its maximum closed position. Because of the larger cross section of the intake channel 3, the intake air is choked to 30%. The edge 12 protruding into the channel is curved in the flow direction. This reduces the flow resistance in the closed position.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve configured to control two gas flows, comprising:
 a housing;
 a shaft arranged in the housing configured to be actuated by an electric motor;
 a first channel arranged in the housing that conducts a first gas;
 a second channel arranged in the housing that conducts a second gas
 a first flap arranged in the first channel configured to open and close the first channel, wherein the first flap is arranged rotatably on the shaft;
 a second flap configured to open and close the second channel, wherein the second flap does not begin to close the second channel until an opening cross section of the first channel reaches fixed, a predefined value greater than zero;
 a third channel into which the first channel and the second channel open; and
 a connecting element arranged on the first flap, the connecting element being connected to the second flap such that any rotation of the first flap causes a rotation of the second flap.

2. The valve as claimed in claim 1, wherein the connecting element is detachably connected to both flaps.

3. The valve as claimed in claim 1, wherein the connecting element is formed integrally with one of the first flap and the second flap.

4. The valve as claimed in claim 3, wherein the connecting element is made of the same material as one of the first flap and the second flap.

5. The valve as claimed in claim 3, wherein the connecting element is formed integrally with the second flap.

6. The valve as claimed in claim 5, wherein the first channel is an exhaust channel.

7. The valve as claimed in claim 6, wherein the second channel is an intake channel.

8. The valve as claimed in claim 7, wherein the third channel is a mixing channel.

9. The valve as claimed in claim 1, wherein the first flap and the second flap are a same material.

10. The valve as claimed in claim 1, wherein the first flap and the second flap are different materials.

11. The valve as claimed in claim 1, wherein the second flap has a rectangular form and the second channel, at least in a pivot region of the second flap, has a corresponding rectangular channel cross section.

12. The valve as claimed in claim 1, wherein at least one of the first flap and the second flap comprises a stop.

13. The valve as claimed in claim 1, wherein the first, second, and third channels are parallel to each other.

14. The valve as claimed in claim 1, wherein the second flap leaves a cross sectional portion of the second channel open and the second flap is curved in the flow direction.

15. The valve as claimed in claim 1, wherein the second flap does not close the second channel until an opening cross section of the first channel reaches about 40%.

16. The valve as claimed in claim 1, wherein the second flap closes the second channel no more than 70%.

\* \* \* \* \*